US012691867B2

(12) United States Patent
Jc et al.

(10) Patent No.: US 12,691,867 B2
(45) Date of Patent: Jul. 28, 2026

(54) HYBRID ELECTRIC VEHICLE AND DRIVING CONTROL METHOD THEREFOR

(71) Applicants: HYUNDAI MOTOR COMPANY, Seoul (KR); KIA CORPORATION, Seoul (KR)

(72) Inventors: Min Gyun Jc, Ansan-si (KR); Jae Young Choi, Seoul (KR); Hoon Han, Hwaseong-si (KR); Gwang Il Du, Ansan-si (KR); Han Nah Song, Daejeon (KR); Chun Hyuk Lee, Seongnam-si (KR); Kwon Chae Chung, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 444 days.

(21) Appl. No.: 17/978,723

(22) Filed: Nov. 1, 2022

(65) Prior Publication Data

US 2023/0365121 A1     Nov. 16, 2023

(30) Foreign Application Priority Data

May 11, 2022     (KR) ........................ 10-2022-0057814

(51) Int. Cl.
B60W 20/30          (2016.01)
B60K 6/547          (2007.10)
(Continued)

(52) U.S. Cl.
CPC ............. B60W 20/30 (2013.01); B60K 6/547 (2013.01); B60W 10/02 (2013.01); B60W 10/06 (2013.01);
(Continued)

(58) Field of Classification Search
CPC ...... B60W 20/30; B60W 10/02; B60W 10/06; B60W 10/08; B60W 10/11; B60W 20/40;
(Continued)

(56) References Cited

U.S. PATENT DOCUMENTS

2009/0233762 A1\*   9/2009  Choby ............ B60W 30/18136
                                                         701/53
2017/0217424 A1\*   8/2017  Park ...................... B60W 20/20
(Continued)

FOREIGN PATENT DOCUMENTS

JP          2001310654 A  \* 11/2001  ............. B60K 6/543
JP          2015182620 A  \* 10/2015
(Continued)

OTHER PUBLICATIONS

Dong "Coordinated clutch slip control for the engine start of vehicles with P2-hybrid automatic transmissions" Mechanism and Machine Theory 153 (2020) (Year: 2020).\*
(Continued)

*Primary Examiner* — Hitesh Patel
*Assistant Examiner* — Shien Ming Chou
(74) *Attorney, Agent, or Firm* — Lempia Summerfield Katz LLC

(57) ABSTRACT

A hybrid electric vehicle and a method of driving control for same, which more effectively increases an amount of regenerative braking during deceleration and allows a rapid restart. A method for controlling a hybrid electric vehicle, including a step-variable transmission according to an embodiment of the present disclosure, may include an operation of prohibiting shifting when a preconfigured deceleration braking condition is satisfied. The method may further include an operation of slip-controlling an engine clutch disposed between an engine and a driving motor when an acceleration pedal is operated before a car stop (Continued)

holding time, in which the deceleration braking condition is maintained, exceeds a preconfigured reference time.

17 Claims, 5 Drawing Sheets

(51) Int. Cl.

| | |
|---|---|
| *B60W 10/02* | (2006.01) |
| *B60W 10/06* | (2006.01) |
| *B60W 10/08* | (2006.01) |
| *B60W 10/11* | (2012.01) |
| *B60W 20/40* | (2016.01) |

(52) U.S. Cl.

CPC ............ *B60W 10/08* (2013.01); *B60W 10/11* (2013.01); *B60W 20/40* (2013.01); *B60W 2520/10* (2013.01); *B60W 2540/10* (2013.01); *B60W 2540/12* (2013.01); *B60W 2710/025* (2013.01); *B60W 2710/0666* (2013.01); *B60W 2710/083* (2013.01); *B60W 2710/1005* (2013.01); *B60Y 2200/92* (2013.01)

(58) Field of Classification Search

CPC ......... B60W 2520/10; B60W 2540/10; B60W 2540/12; B60W 2710/025; B60W 2710/0666; B60W 2710/083; B60W 2710/1005; B60W 2510/182; B60W 10/023; B60W 30/18027; B60W 30/18063; B60W 20/15; B60W 20/00; B60W 10/10; B60W 10/18; B60W 30/181; B60W 30/18127; B60W 40/105; B60K 6/547; B60K 6/387; B60K 2006/4825; B60K 6/442; B60K 6/26; B60K 6/36; B60K 6/38; B60Y 2200/92; F16H 59/14; F16H 59/18; F16H 59/44; F16H 59/54; F16H 2061/161; F16H 61/16; Y02T 10/62; B60L 7/10

USPC .......................................................... 701/22

See application file for complete search history.

(56) References Cited

U.S. PATENT DOCUMENTS

| | | | | |
|---|---|---|---|---|
| 2018/0072305 | A1* | 3/2018 | Choi ...................... | B60W 10/11 |
| 2018/0297578 | A1* | 10/2018 | Park ...................... | B60K 6/485 |
| 2020/0180631 | A1* | 6/2020 | Na ........................ | B60W 10/06 |

FOREIGN PATENT DOCUMENTS

| | | |
|---|---|---|
| JP | 2019093811 A | 6/2019 |
| JP | 2020114709 A | 7/2020 |
| KR | 101974142 B1 | 4/2019 |
| KR | 20200123297 A | 10/2020 |
| KR | 20210152059 A | 12/2021 |

OTHER PUBLICATIONS

Hu, "Torque coordinated control in engine starting process for a single-motor hybrid electric vehicle", "Advances in Mechanical Engineering", 2017, vol. 9(7) 1-10 (Year: 2017).*

* cited by examiner

HYBRID ELECTRIC VEHICLE AND DRIVING CONTROL METHOD THEREFOR

CROSS-REFERENCE TO RELATED APPLICATION

This application is based on and claims priority under 35 U.S.C. 119 to Korean Patent Application No. 10-2022-0057814, filed on May 11, 2022, in the Korean Intellectual Property Office, the disclosure of which is herein incorporated by reference in its entirety.

TECHNICAL FIELD

The present disclosure relates to a hybrid electric vehicle and a driving control method therefor, where the amount of regenerative braking is increased effectively during deceleration, and where a quick restart is possible.

BACKGROUND

Recently, in line with increasing environmental interests, there has been increasing use of eco-friendly vehicles that use electric motors as power sources. Examples of eco-friendly vehicles, also referred to as motorized vehicles, include hybrid electric vehicles (HEV) and electric vehicles (EV).

HEVs may selectively use the engine and the motor according to the driving situation. Further, HEVs are capable of regenerative braking, thereby having a higher fuel efficiency than vehicles solely having internal combustion engines.

When a HEV has a step-variable transmission, it is necessary to consider the shifting timing in connection with conducting regenerative braking. In many cases, the second or higher shifting stage is used for driving before deceleration occurs. If the vehicle speed drops, shifting to the first stage is commonly controlled to occur before the vehicle fully stops such that the vehicle can restart after a full stop. However, regenerative braking is impossible in a range in which the wheels and the motor are temporarily disconnected during a shifting process and, even in other ranges, the torque of the driving source needs to be reduced during shifting. As such, a torque control process is necessary for shifting, making it difficult to control the regenerative braking. Therefore, if a typical HEV reaches a designated vehicle speed or lower (i.e., regenerative braking speed), and if regenerative braking occurs, the braking force is replaced with hydraulic braking, thereby ending the regenerative braking. Therefore, the speed at which regenerative braking ends is configured by considering the shifting timepoint before stopping and cooperative control responsiveness of hydraulic braking. It is substantially difficult for the speed at which regenerative braking ends to reach 0 kph.

There is a problem in that, after braking at a high deceleration rate (designated deceleration or higher), if the driver manipulates the acceleration pedal for reacceleration before a full stop, acceleration becomes difficult until the already-started shifting ends. This is described with reference to FIG. 1.

FIG. 1 illustrates a problem of a reacceleration situation during deceleration of a typical HEV.

In FIG. 1, the horizontal axis refers to time, and the vertical axis refers to the revolutions per minute (RPM) of the driving source. Further, it is assumed that the engine is off during deceleration, and the current shifting stage is the third stage.

Referring to FIG. 1, the RPM of a motor connected to the wheels through a transmission drops as deceleration proceeds. The vehicle determines shifting according to a designated condition (for example, vehicle speed) and enters control for shifting from the third stage to the first stage. If the driver intends to accelerate and manipulates the acceleration pedal before the vehicle speed reaches zero (i.e., before a full stop) after entering shifting control, thereby increasing the accelerator pedal position sensor (APS) value, it becomes difficult for the motor to exert a driving force until the shifting ends.

Such a problem becomes noticeable when the engine and the motor are selectively connected through the engine clutch. More specifically, the engine clutch is commonly controlled to minimize slips and impacts during engagement such that engagement occurs only when the engine RPM and motor RPM are similar. Therefore, even if the engine starts to use the engine driving force as a result of a high APS value, according to the driver's will to accelerate, it becomes difficult to use the engine driving force for acceleration until the motor RPM rises and approaches the engine RPM after shifting ends. This is because there is a large difference between the engine RPM and the motor RPM.

SUMMARY

The present disclosure is to provide a hybrid electric vehicle and a driving control method therefor, where the amount of regenerative braking is increased effectively during deceleration, and where a quick restart is possible.

The technical subjects pursued in the disclosure shall not be limited to the above-mentioned technical subjects. Other technical subjects which are not mentioned may be clearly understood, through the following descriptions, by those having ordinary skill in the art to which the disclosure pertains.

In accordance with an aspect of the present disclosure, a method for controlling a hybrid electric vehicle including a step-variable transmission according to an embodiment of the present disclosure may include prohibiting shifting when a preconfigured deceleration braking condition is satisfied. The method for controlling a hybrid electric vehicle may further include slip-controlling an engine clutch disposed between an engine and a driving motor when an acceleration pedal is operated before a car stop holding time, in which the deceleration braking condition is maintained, exceeds a preconfigured reference time.

For example, the deceleration braking condition may be satisfied when a brake pedal is operated, a car speed is lower than a first car speed, and a braking torque is larger than a first torque.

For example, the method may further include performing shifting to a first stage when the car stop holding time exceeds the reference time.

For example, the slip-controlling may include outputting torque from the engine and a starter/generator motor connected to the engine.

For example, the engine and the starter/generator motor may be directly connected to each other.

For example, the method may further include raising the creep torque of a current shifting stage before the car stop holding time exceeds the reference time.

For example, the method may further include comparing the braking torque with a preconfigured second torque when the acceleration pedal is not operated before the car stop holding time exceeds the reference time.

For example, the method may further include restoring the raised creep torque when the braking torque is equal to or larger than the second torque as a result of the comparison.

For example, the slip-controlling may be performed until a car speed becomes larger than a second car speed.

In addition, a hybrid electric vehicle, according to an embodiment of the present disclosure, may include an engine, a driving motor, an engine clutch disposed between the engine and the driving motor, a step-variable transmission having an input terminal connected to the driving motor, and a controller unit. The controller unit is configured to prohibit shifting of the step-variable transmission when a preconfigured deceleration braking condition is satisfied. Further, the controller unit is configured to slip-control the engine clutch when an acceleration pedal is operated before a car stop holding time, in which the deceleration braking condition is maintained, exceeds a preconfigured reference time.

For example, the deceleration braking condition may be satisfied when a brake pedal is operated, a car speed is lower than a first car speed, and a braking torque is larger than a first torque.

For example, the controller unit may control to perform shifting to a first stage when the car stop holding time exceeds the reference time. In other words, the controller unit allows shifting to a first stage to be performed when the car stop holding time exceeds the reference time.

For example, the controller unit may control torque to be output from the engine and the starter/generator motor while the slip-control is performed.

For example, the engine and the starter/generator motor may be directly connected to each other.

For example, the controller unit may raise the creep torque of a current shifting stage before the car stop holding time exceeds the reference time.

For example, the controller unit may compare the braking torque with a preconfigured second torque when the acceleration pedal is not operated before the car stop holding time exceeds the reference time.

For example, the controller unit may restore the raised creep torque when the braking torque is equal to or larger than the second torque as a result of the comparison.

For example, the controller unit may perform slip-control until a car speed becomes larger than a preconfigured second car speed.

According to various embodiments of the present disclosure, as described herein, fuel efficiency may be improved by lowering the vehicle speed at which regenerative braking ends.

In addition, shifting is prohibited during deceleration by determining whether a condition is satisfied through monitoring during deceleration, thereby reducing the restart delay caused by shifting.

Moreover, faster (e.g., quicker) acceleration is possible through a first motor torque output and engine clutch slip control.

Advantageous effects obtainable from the present disclosure may not be limited to the above-mentioned effects. Other effects which are not mentioned may be clearly understood, through the following descriptions, by those having ordinary skill in the art to which the present disclosure pertains.

BRIEF DESCRIPTION OF THE DRAWINGS

In order that the disclosure may be well understood, there are described various forms thereof, given by way of example, reference being made to the accompanying drawings, in which.

Figure 1:
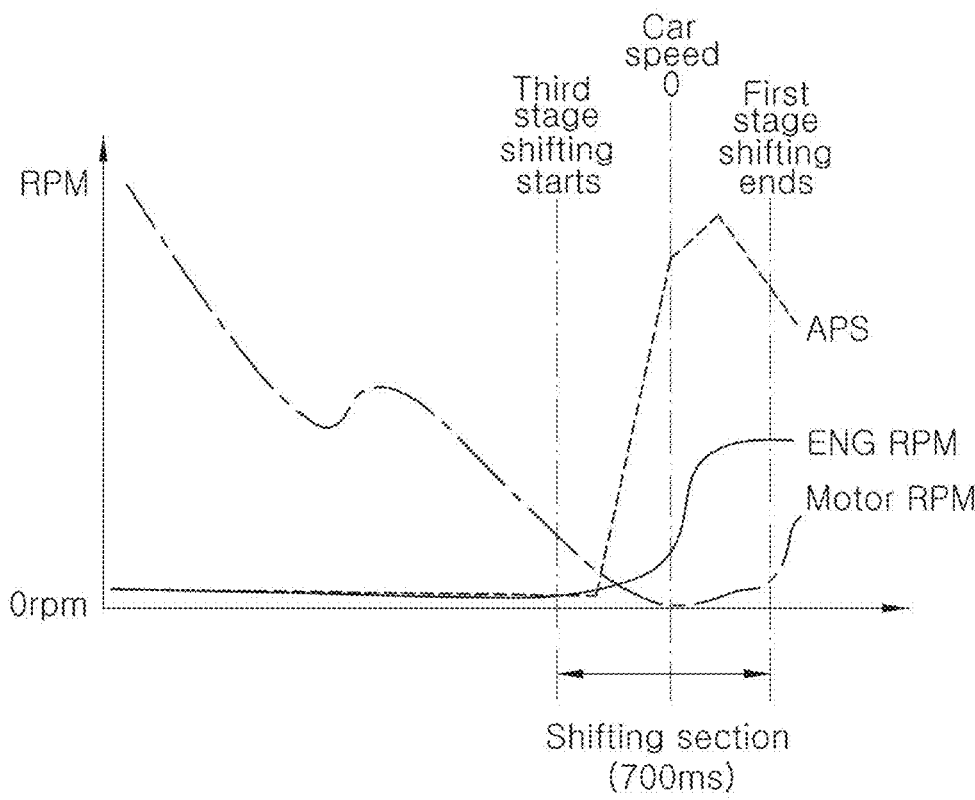
FIG. 1 is a view illustrating a problem with reacceleration during deceleration in a general hybrid electric vehicle.

The drawings described herein are for illustration purposes only and are not intended to limit the scope of the present disclosure in any way.

DETAILED DESCRIPTION

Hereinafter, embodiments disclosed in the present specification are described in detail with reference to the accompanying drawings. The same or similar elements are given the same and similar reference numerals, so duplicate descriptions thereof are omitted. The terms "module" and "unit" used for the elements in the following description are given or interchangeably used in consideration of the ease of writing the specification, and do not have distinct meanings or roles by themselves. In addition, in relation to describing the embodiments disclosed in the present specification, when the detailed description of the relevant known technology is determined to unnecessarily obscure the gist of the present disclosure, that detailed description may be omitted. Further, the accompanying drawings are provided only for easy understanding of the embodiments disclosed in the present specification. The technical spirit disclosed herein is not limited to the accompanying drawings, and it should be understood that all changes, equivalents, or substitutes thereof are included in the spirit and scope of the present disclosure.

Terms including an ordinal number such as "first," "second," or the like may be used to describe various elements, but the elements are not limited to the terms. The above terms are used only for the purpose of distinguishing one element from another element.

Where an element is referred to as being "connected" or "coupled" to any other element, it should be understood that another element may be provided therebetween, as well as that the element may be directly connected or coupled to the other element. In contrast, where an element is "directly connected" or "directly coupled" to any other element, it should be understood that no other element is present therebetween.

A singular expression may include a plural expression unless they are definitely different in context.

As used herein, the expression "include" or "have" are intended to specify the existence of mentioned features, numbers, steps, operations, elements, components, or combinations thereof. The expression "include" or "have" should be construed as not precluding the possible existence or addition of one or more other features, numbers, steps, operations, elements, components, or combinations thereof.

A unit or a control unit included in names such as a motor control unit (MCU) and a hybrid control unit (HCU) is merely a term widely used for naming a controller configured to control a specific function of a vehicle, but does not mean a generic function unit. For example, in order to control a function that a control unit is responsible for, each control unit may include a communication device configured to communicate with a sensor or another control unit, a memory configured to store an operation system, a logic command, or input/output information, and at least one processor. The at least one processor is configured to perform determination, calculation, decision or the like which are required for responsible function controlling.

When a component, device, element, or the like of the present disclosure is described as having a purpose or performing an operation, function, or the like, the component, device, or element should be considered herein as being "configured to" meet that purpose or to perform that operation or function.

Before describing a driving control method of a hybrid electric vehicle according to embodiments of the present disclosure, a control system and a structure of a hybrid electric vehicle applicable to the embodiments are described first.

Figure 2:
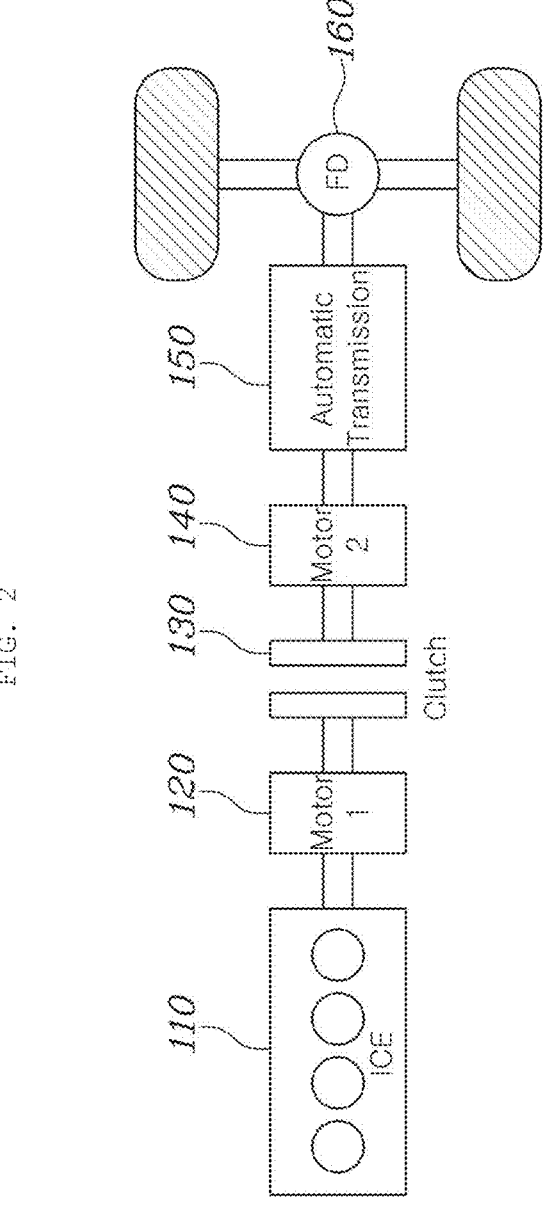
FIG. 2 illustrates an example of a power train configuration of a hybrid electric vehicle according to an embodiment of the present disclosure.

FIG. 2 illustrates an example of a power train configuration of a hybrid electric vehicle according to an embodiment of the present disclosure.

FIG. 2 shows a power train of a hybrid electric vehicle employing a parallel-type hybrid system in which two motors 120 and 140 and an engine clutch 130 are mounted between an engine 110 (an internal combustion engine (ICE)) and a transmission 150. The parallel-type hybrid system has one motor 140 continuously connected to an input terminal of the transmission 150, and thus may be called a transmission-mounted electric drive (TMED) hybrid system.

In this example, a first motor 120 of the two motors 120 and 140 may be disposed between the engine 110 and one end of the engine clutch 130. An engine shaft of the engine 110 and a first motor shaft of the first motor 120 may be directly connected to each other so as to continuously rotate together.

One end of a second motor shaft of a second motor 140 may be connected to the other end of the engine clutch 130, and the other end of the second motor shaft may be connected to an input terminal of the transmission 150.

The second motor 140 may have a larger output compared to the first motor 120 and the second motor 140 may function as a driving motor. In addition, the first motor 120 may function as a starter motor configured to crank the engine 110 when the engine 110 is starting, recollect rotation energy of the engine 110 through power generation when the engine is turned off, and perform power generation with the power of the engine 110 when the engine 110 is driven.

In the hybrid electric vehicle, including the power train shown in FIG. 1, when a driver steps on an accelerator after start (e.g., HEV ready), the second motor 140 may be driven by using the power of a battery (not shown) first in a state in which the engine clutch 130 is opened. Accordingly, wheels are moved by the power of the second motor 140, having passed the transmission 150 and a final drive (FD) 160 (i.e., EV mode). When the vehicle is slowly accelerated and needs more power, the first motor 120 operates to crank the engine 110.

When a rotation speed difference between the engine 110 and the second motor 140 after the engine 110 is started falls within a predetermined range, the engine clutch 130 is engaged such that the engine 110 and the second motor 140 rotate together (i.e., the transition from an EV mode to a HEV mode). Accordingly, through a torque blending process, the output of the second motor 140 decreases and the output of the engine 110 increases, thus satisfying the required torque of a driver. In the HEV mode, the engine 110 may satisfy most of the required torque. The difference between the engine torque and the required torque may be compensated through at least one of the first motor 120 and the second motor 140. For example, when the engine 110 outputs a torque higher than the required torque when considering the efficiency of the engine 110, the first motor 120 or the second motor 140 may generate power as much as the engine torque surplus. However, when the engine torque is less than the required torque, at least one of the first motor 120 and the second motor 140 may output the insufficient torque.

When a predetermined engine off condition such as speed reduction of a vehicle is satisfied, the engine clutch 130 is opened and the engine 110 is stopped (i.e., the transition from the HEV mode to the EV mode). The battery is charged through the second motor 140 by using the driving force of the wheel when decelerating, and this is called braking energy regeneration or regenerative braking.

Generally, a step-variable transmission, a multidisc clutch, or, for example, a dual clutch transmission (DCT) may be used for the transmission 150.

Figure 3:
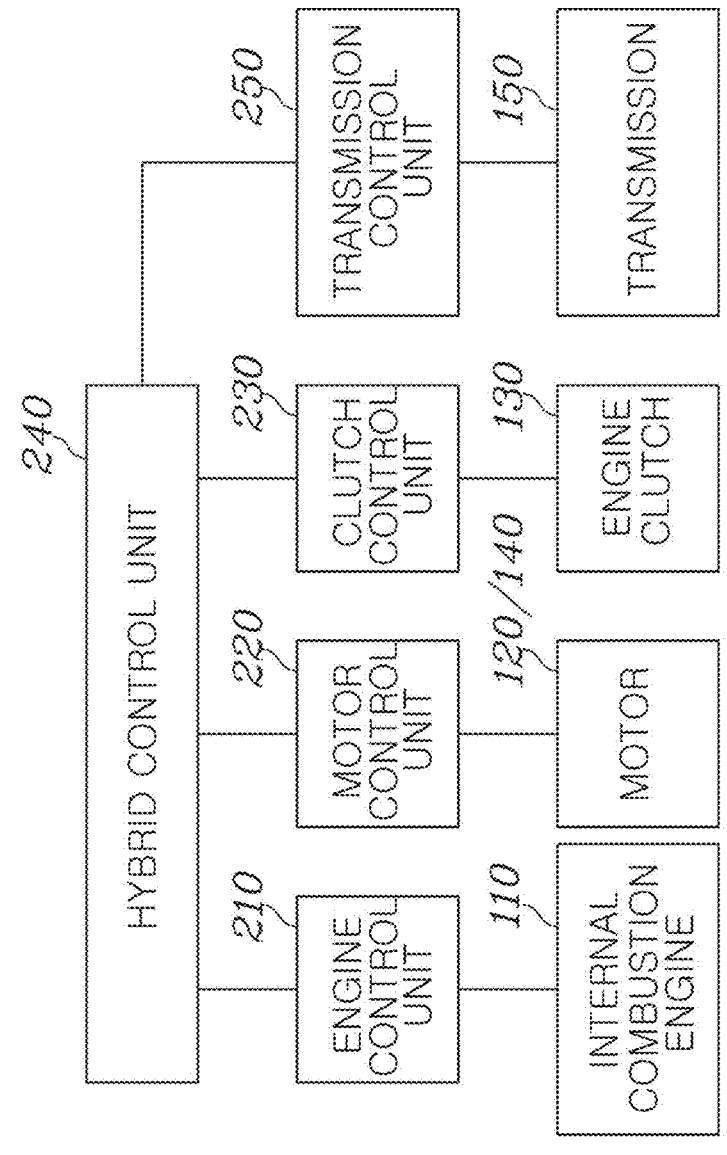
FIG. 3 shows an example of a control system configuration of a hybrid electric vehicle according to an embodiment of the present disclosure.

FIG. 3 shows an example of a control system configuration of a hybrid electric vehicle according to an embodiment of the present disclosure.

Referring to FIG. 3, in the hybrid electric vehicle to which embodiments of the present disclosure may be applied, an internal combustion engine 110 may be controlled by an engine controller unit 210, torque of the first motor 120 and the second motor 140 may be controlled by a motor controller unit 220 (MCU), and the engine clutch 130 may be controlled by a clutch controller unit 230. The engine controller unit 210 may also be referred to as an engine management system (EMS). In addition, the transmission controller unit 250 may control the transmission 150.

The motor controller unit 220 may control a gate drive unit (not shown) by a control signal in a pulse width modulation form based on a motor angle, phase voltage, phase current, required torque, or the like of each motor 120 and 140. The gate drive unit may also control an inverter (not shown) for driving each motor 120 and 140 according thereto.

Each controller unit may be connected to a hybrid controller unit (HCU) 240, which is an upper controller unit that controls the overall power train, including a mode switching process, so as to provide, to the hybrid controller unit 240, information required for control of the engine clutch during driving mode change according to the control of the hybrid controller unit 240 or shifting gears, and/or information required for engine stop control. The hybrid controller unit 240 may also perform an operation according to a control signal.

For example, the hybrid controller unit 240 may determine whether to perform a transition between EV-HEV modes or CD-CS modes (in case of PHEV) according to the driving condition of the vehicle. To this end, the hybrid controller unit 240 may determine an open time point of the engine clutch 130 and perform a hydraulic control when the engine clutch 130 is open. In addition, the hybrid controller unit 240 may determine a state (lock-up, slip, open, and the like) of the engine clutch 130 and control a fuel injection stopping time point of the engine 110. Furthermore, the hybrid controller unit 240 may transfer, to the motor controller unit 220, a torque command for controlling torque of the first motor 120 for the engine stopping control, so as to control engine rotation energy recovery. The hybrid controller unit 240 may determine the conditions of each driving source 110, 120, and 140 for satisfying the required torque. The hybrid controller unit 240 may also determine the required driving force to be shared by each driving source 110, 120, and 140. Further, the hybrid controller unit 240 may transfer a torque command to the controller units 210 and 220, which are configured to control each driving source.

Of course, it should be apparent to a person having ordinary skill in the art that the connection relationship between the controller units and the function/division of the controller units are illustrative and the names of the controller units are not limited thereto. For example, the hybrid controller unit 240 may be implemented such that the functions thereof are provided by any one of the controller units other than the hybrid controller unit 240 or such that the functions thereof are distributed and provided by two or more of the other controller units.

It should be apparent to a person having ordinary skill in the art that the configuration of FIG. 2 and FIG. 3 is merely an example of a hybrid electric vehicle, and a hybrid electric vehicle applicable to an embodiment is not limited to the structure shown and described herein.

In an embodiment of the present disclosure, faster acceleration is suggested to be performed through a torque output of the first motor 120 and a slip-control of the engine clutch 130 when the driver's intent to brake is maintained above a certain level, shifting is prohibited for a certain period of time, and a driver's intent to accelerate is present.

Figure 4:
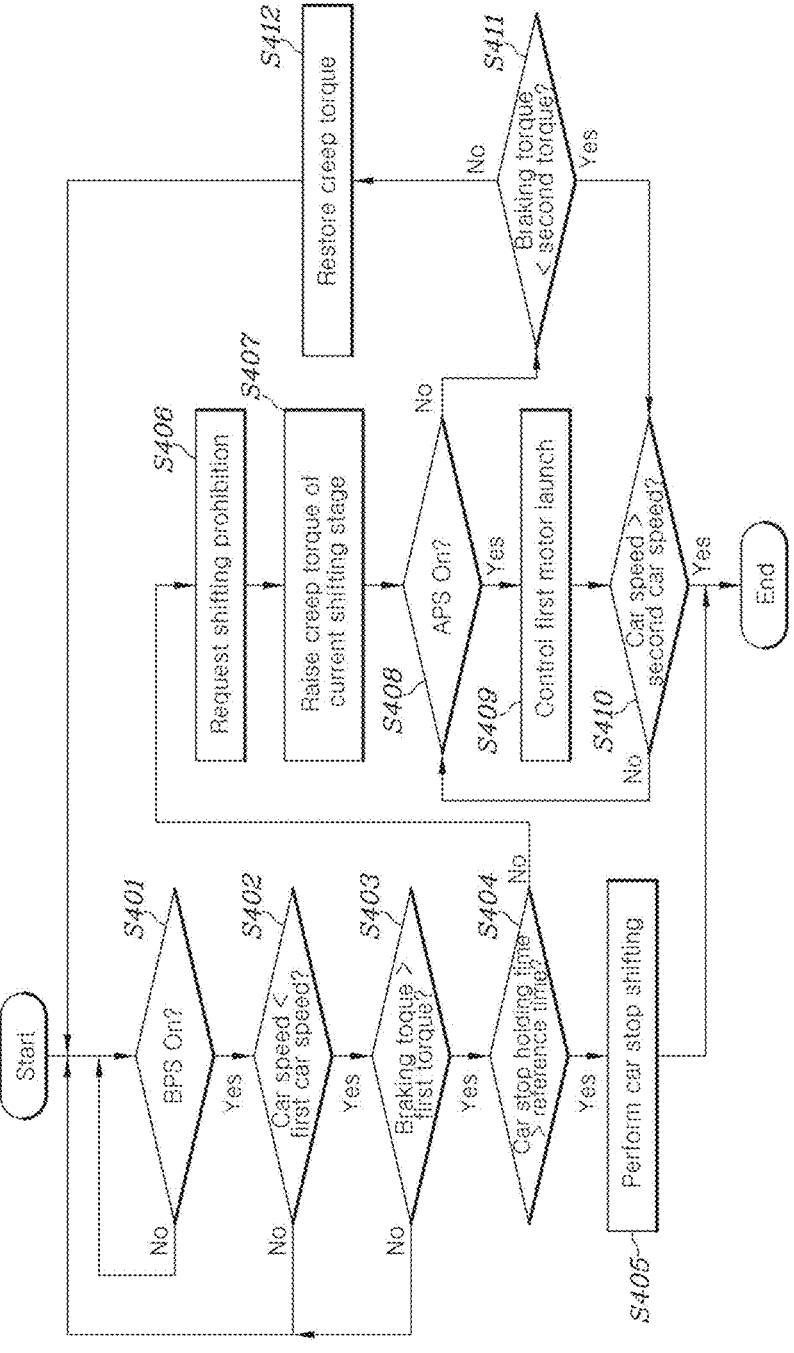
FIG. 4 illustrates an example of a control process during braking deceleration of a hybrid electric vehicle according to an embodiment of the present disclosure.

FIG. 4 illustrates an example of a control process during braking deceleration of a hybrid electric vehicle according to an embodiment of the present disclosure.

Referring to FIG. 4, a brake pedal position sensor (BPS) value may be detected (BPS On, S401) according to an operation of a brake pedal. Further, referring to FIG. 4, a car speed may be lower than a preconfigured first car speed when braking is performed (Yes in S402). Furthermore, when braking torque is higher than a preconfigured first torque (Yes in S403), a car stop holding time may be monitored (S404).

In this example, each of the first car speed and the first torque may be a value determined through an experiment. In addition, the car stop holding time may mean that the car speed is maintained lower than the first car speed and the braking torque is maintained higher than the first torque, rather than maintaining a completely stopped state (for example, a car speed of zero kph).

When the car stop holding time is larger than a preconfigured reference time (Yes in S404), it may be considered that a general stop is operated without the driver's intent to accelerate and thus shifting to stop (for example, shifting to a first stage) may be performed. When a request for the prohibition of shifting has been made first, the hybrid controller unit 240 may cancel a shift prohibition request to allow shifting to stop to be performed. In addition, the preconfigured reference time may be determined through an experiment, but this is illustrative and not necessarily limited thereto.

On the contrary, when the car stop holding time is less than or equal to the preconfigured reference time (No in S404), the hybrid controller unit 240 may transfer a shifting prohibition request to the transmission controller unit 250 (S406). This is for preventing a delay due to a shifting operation when a driver shows intent to accelerate during a stop. Depending on implementation, the operation (S406) may be performed immediately when the car speed is lower than the first car speed and the braking torque is higher than the first torque (Yes in S403).

In addition, the hybrid controller unit 240 may raise the creep torque of a current shifting stage for a better feeling during a restart (S407). The creep torque generally means torque transferred to an output terminal of a transmission when APS/BPS is turned off in a vehicle, including only an internal combustion engine. However, when a hybrid electric vehicle has decelerated enough to stop, a driving motor becomes a main driving source in the EV mode. Thus, the creep torque may mean torque to be output from the driving motor 140 to simulate an internal combustion engine. For example, raising creep torque may be achieved by transferring a command for larger torque compared to when the hybrid controller unit 240 outputs general creep torque to the motor controller unit 220 (APS & BPS off, and the like).

In addition, the size of creep torque may be differently configured for each gear stage. For example, creep torque for each gear stage may be larger as the shifting stage is lower (e.g., creep torque of a first stage >creep torque of a second stage>creep torque of a third stage). Accordingly, the raising of the creep torque of the current shifting stage may mean that creep torque is raised such that wheel torque by raised creep torque in the current shifting stage corresponds to wheel torque by creep torque in a first stage.

When shifting is prohibited and a driver shows intent to accelerate (i.e., APS is turned on, Yes in S408), the hybrid controller unit 240 may perform first motor launch control (S409). The first motor launch control may refer to a control in which torque is also output from the first motor 120 directly connected to the engine 110 while the engine 110 is turned on, to provide an improved sense of acceleration. The engine clutch 130 is controlled in a slip state to allow torque of the engine 110 and the first motor 120 to be transmitted to an input terminal of the transmission 150 as much as transmission torque of the engine clutch 130. In general control, the engine clutch 130 is engaged only when the speed of the engine 110 and the first motor 120 becomes similar to the speed of the input terminal of the transmission 150. However, in the first motor launch control, even if the speed of the engine 110 and the first motor 120 is faster than the speed (i.e., the speed of the second motor) of the input terminal, torque transmission is possible through a slip of the engine clutch 130, thus allowing faster acceleration.

Thereafter, when a car speed during acceleration according to APS becomes larger than a preconfigured second car speed, the restart control during braking according to an embodiment may be terminated (Yes in S410), and power train control may be performed according to default control. Even when the driver has no intent to accelerate (No in S408) and the braking torque is lower than the preconfigured second torque (Yes in S411), if the car speed becomes larger than the preconfigured second car speed, the restart control during braking according to an embodiment may be terminated (Yes in S410).

On the contrary, when the driver has no intent to accelerate (No in S408) and the braking torque is equal to or more than the second torque (No S411), the creep torque may be recovered (S412).

In the control process, according to the embodiment described above with reference to FIG. 4, each torque condition may be based on the wheel torque, and the car stop holding time may be counted in a Yes state in S403 or counted from a complete stop (i.e., the car speed=0). In addition, the improved creep torque may be configured to the same level of creep torque output from the wheel when the shifting stage is in a first stage.

Figure 5:
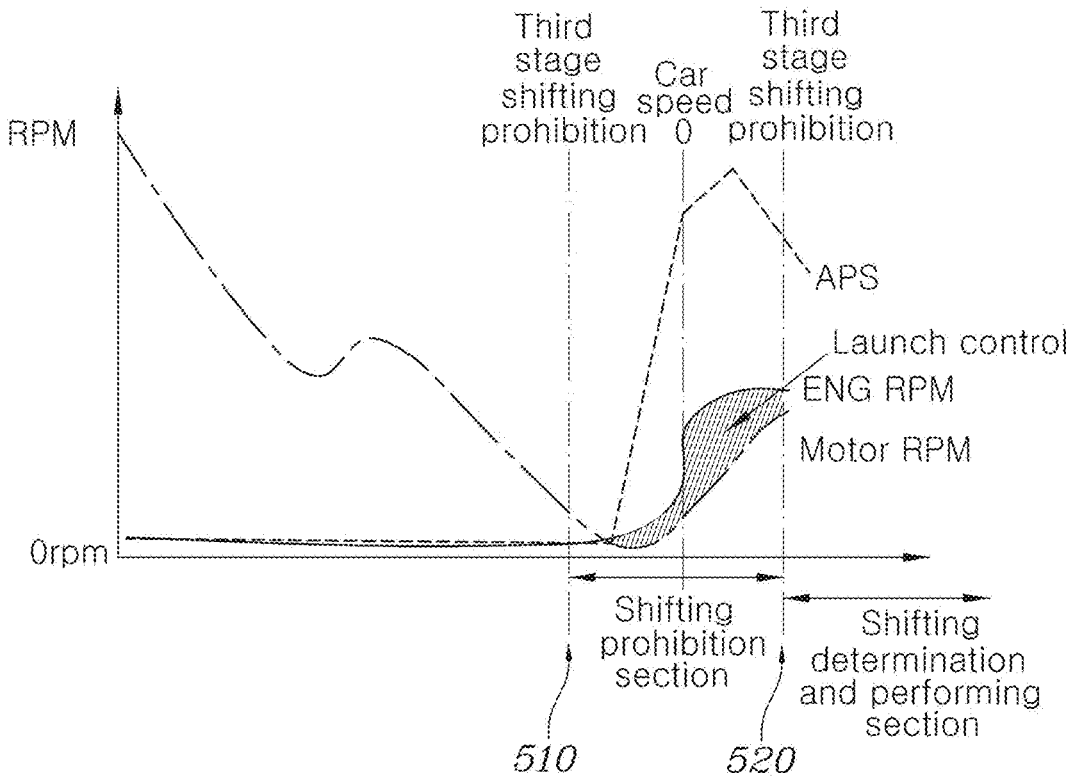
FIG. 5 illustrates an effect of a reacceleration control during braking deceleration of a hybrid electric vehicle according to an embodiment of the present disclosure.

FIG. 5 illustrates an effect of a reacceleration control during braking deceleration of a hybrid electric vehicle according to an embodiment of the present disclosure.

The situation described in FIG. 5 is similar to the situation described in FIG. 1 in that there is a driver's operation of the accelerator pedal during braking deceleration. However, depending on the car speed and braking torque, monitoring of the car stop holding time starts (510) and shifting is prohibited. Therefore, before the car stop holding time reaches a reference time, when the driver's intent to reaccelerate is present (APS On), immediate acceleration is possible without delay due to shifting, and the torque of the engine 110 and the first motor 120 is transferred to the wheel through the first motor launch control, thus allowing faster reacceleration.

As described above with reference to FIG. 4, when the car speed reaches the second car speed (520), since the reacceleration control is released during braking deceleration, the shifting prohibition is canceled. Thus, it is possible to determine shifting and perform shifting according to a default logic (for example, APS, a car speed, and the like).

As described in FIG. 5, even when the car speed reaches zero, shifting does not occur until the car stop holding time reaches the reference time, thus causing no torque change in performing regenerative braking. Therefore, regenerative braking and car speed may be reduced to substantially zero.

The method for controlling reacceleration during braking deceleration described above may be applied to a hybrid power train in which the first motor 120 is not directly connected to the engine 110 (e.g., connected with a pulley and a belt).

The present disclosure as described above may be implemented as codes in a computer-readable medium in which a program is recorded. The computer-readable medium includes all types of recording devices in which data readable by a computer system are stored. Examples of the computer-readable medium include a hard disk drive (HDD), a solid state disk (SSD), a silicon disk drive (SDD), a read-only memory (ROM), a random access memory (RAM), a Compact Disc, read-only-memory (CD-ROM), a magnetic tape, a floppy disk, an optical data storage device, and the like. Further, the above-detailed description should not be construed in a limitative sense, but should be considered in an illustrative sense in all aspects. The scope of the present disclosure should not be determined by reasonable interpretation of the appended claims. All changes and modifications within the equivalent scope of the present disclosure fall within the scope of the present disclosure.

What is claimed is:

1. A method for controlling a hybrid electric vehicle comprising a step-variable transmission, the method comprising:

prohibiting shifting based on determining that a preconfigured deceleration braking condition is satisfied; and slip-controlling an engine clutch disposed between an engine and a driving motor based on determining that an acceleration pedal is operated before a car stop holding time while the shifting is prohibited, in which the preconfigured deceleration braking condition is maintained, exceeds a preconfigured reference time, wherein the preconfigured deceleration braking condition is satisfied when a brake pedal is operated, a car speed is lower than a first car speed, and a braking torque is larger than a first torque, and wherein the car stop holding time includes a time during which the car speed is maintained lower than the first car speed and the braking torque is maintained higher than the first torque.

2. The method of claim 1, further comprising:

performing shifting to a first stage based on determining that the car stop holding time exceeds the preconfigured reference time without the acceleration pedal being operated.

3. The method of claim 1, wherein the slip-controlling includes outputting torque from i) the engine, ii) a starter/generator motor connected to the engine, and iii) the driving motor.

4. The method of claim 3, wherein the engine and the starter/generator motor are directly connected to each other.

5. The method of claim 1, further comprising:

raising a creep torque of a current shifting stage, based on a wheel torque output by a creep torque set for a first stage of the step-variable transmission, before the car stop holding time exceeds the preconfigured reference time.

6. The method of claim 5, further comprising:

comparing a braking torque with a preconfigured second torque based on determining that the acceleration pedal is not operated before the car stop holding time exceeds the preconfigured reference time.

7. The method of claim 6, further comprising:

restoring the raised creep torque when based on determining that the braking torque is equal to or larger than the preconfigured second torque as a result of the comparison.

8. The method of claim 1, wherein the slip-controlling is performed until a car speed becomes larger than a second car speed.

9. A non-transitory computer-readable record medium storing a program that, when executed by a processor, causes the processor to perform the method for controlling a hybrid electric vehicle according to claim 1.

10. A hybrid electric vehicle comprising:

an engine;

a driving motor;

an engine clutch disposed between the engine and the driving motor;

a step-variable transmission having an input terminal connected to the driving motor; and a controller unit configured to prohibit shifting of the step-variable transmission based on determining that a preconfigured deceleration braking condition is satisfied, and slip-control the engine clutch based on determining that an acceleration pedal is operated before a car stop holding time while the shifting is prohibited, in which the preconfigured deceleration braking condition is maintained, exceeds a preconfigured reference time, wherein the controller unit is configured to determine that the preconfigured deceleration braking condition is satisfied based on determining that a brake pedal is operated, a car speed is lower than a first car speed, and a braking torque is larger than a first torque, and wherein the car stop holding time includes a time during which the car speed is maintained lower than the first car speed and the braking torque is maintained higher than the first torque.

11. The hybrid electric vehicle of claim 10, wherein the controller unit is further configured to allow shifting to a first stage based on determining that the car stop holding time exceeds the preconfigured reference time without the acceleration pedal being operated.

12. The hybrid electric vehicle of claim 10, wherein the controller unit is further configured to control torque to be output from i) the engine, ii) a starter/generator motor, and iii) the driving motor while the slip-control is performed.

13. The hybrid electric vehicle of claim 12, wherein the engine and the starter/generator motor are directly connected to each other.

14. The hybrid electric vehicle of claim 10, wherein the controller unit is further configured to raise a creep torque of a current shifting stage, based on a wheel torque output by a creep torque set for a first stage of the step-variable transmission, before the car stop holding time exceeds the preconfigured reference time.

15. The hybrid electric vehicle of claim 14, wherein the controller unit is further configured to compare a braking torque with a preconfigured second torque based on determining that the acceleration pedal is not operated before the car stop holding time exceeds the preconfigured reference time.

16. The hybrid electric vehicle of claim 15, wherein the controller unit is further configured to restore the raised creep torque based on determining that the braking torque is equal to or larger than the preconfigured second torque as a result of the comparison.

17. The hybrid electric vehicle of claim 10, wherein the controller unit is configured to perform slip-control until a car speed becomes larger than a preconfigured second car speed.

* * * * *